Inventor
Ian Ross Adam
By Gordon H. Olson
Attorney

Jan. 21, 1969　　　　I. R. ADAM　　　　3,423,714
WEAR COMPENSATED RUBBER THERMOSTAT
Filed Oct. 19, 1966　　　　　　　　　　　　Sheet 2 of 2
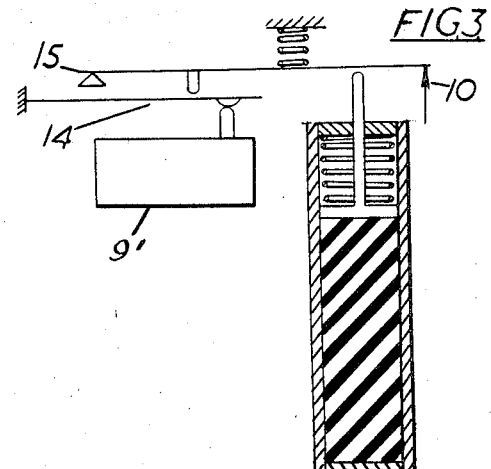
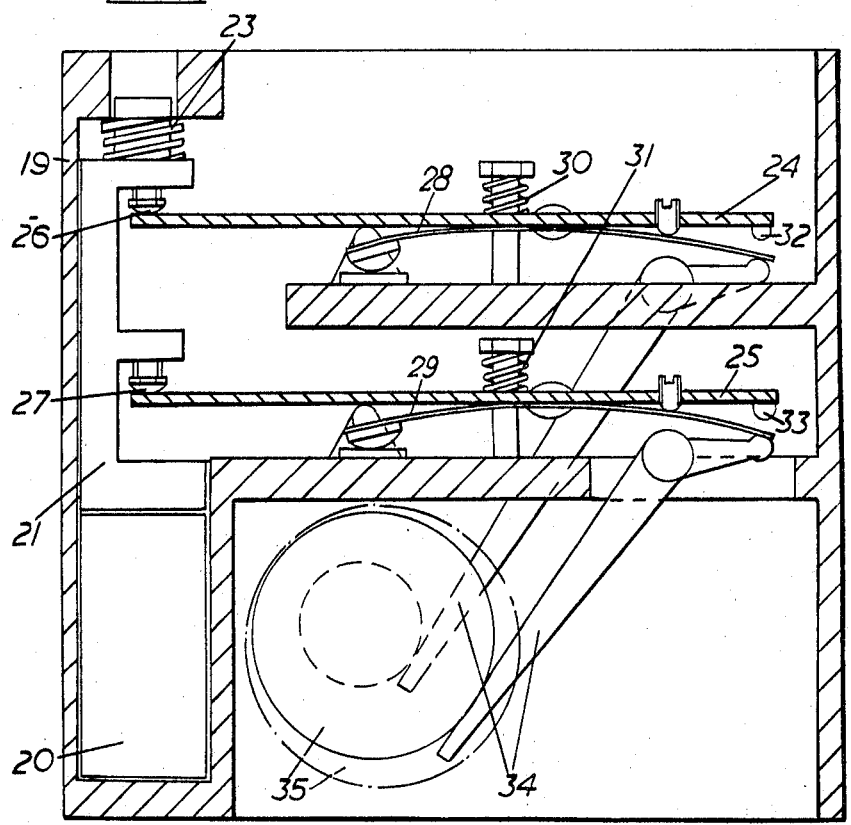
Inventor
Ian Ross Adam
By Gordon H. Olson
Attorney

United States Patent Office 3,423,714
Patented Jan. 21, 1969

3,423,714
WEAR COMPENSATED RUBBER THERMOSTAT
Ian Ross Adam, Netherlee, Scotland, assignor to International Standard Electric Corporation, New York, N.Y., a corporation of Delaware
Filed Oct. 19, 1966, Ser. No. 587,928
Claims priority, application Great Britain, Oct. 29, 1965, 45,871/65
U.S. Cl. 337—382
Int. Cl. H01h 37/46
6 Claims

ABSTRACT OF THE DISCLOSURE

A thermostat in which a body of heat expandable rubber transfers its temperature induced dimensional changes through a piston and linkage to open and close contact points of a switch. Wearable elements in the linkage compensate for wear of the rubber body caused by working against the piston during use.

---

This invention relates to thermostats, and especially to such devices in which the temperature responsive element is a mass of a thermally expandable and contractible material.

Thermostats of the above type have been proposed in which a piston is spring-urged against the temperature responsive element and changes in the volume of that element control the condition of one or more electrical contact sets due to the movement imparted thereby to the piston. With such devices the material of the element in the vicinity of the piston tends, due to successive expansions and contractions, to deteriorate into a powder so that the volume of the element is reduced. This causes the temperature at which the thermostat operates the controlled contact set(s) to increase with life, which could cause considerable inconvenience.

An object of the present invention is to at least minimize the above disadvantage.

According to the present invention there is provided a thermostat, which includes a container in which there is a thermally expandable and contractible solid substance, a piston-like member maintained in engagement with a surface of said substance so that changes in the volume of said substance due to changes in the temperature to which the thermostat is subjected cause corresponding movements of said piston-like member, and switching means controlled by said piston-like member in accordance with temperature changes via at least one wearable member to effect said control, the arrangement being such that changes of the response of the thermostat due to wear of said wearable members compensates at least in part for the changes in said response due to the decrease in the volume of said thermally expandable and contractible substance during the life of the thermostat.

According to the present invention there is further provided a thermostat which includes a container in which there is a thermally expandable and contractible substance formed by a mass of rubber or a rubber substitute, a piston-like member spring-urged into engagement with a surface of said substance due to changes in the temperature to which the thermostat is subjected cause corresponding movements of said piston-like member, and switching means coupled to said piston-like member via a mechanical linkage such that when said temperature reaches a preselected value the condition of said switching means is altered, wherein said linkage includes one or more wearable members so arranged that the changes in the response of the thermostat due to wear in said one or more wearable members at least partly compensates for the changes in said response due to the decrease in volume of said thermally expandable and contractible substance during the life of the thermostat.

The preferred material for the thermally expandable and contractible substance is rubber, although other materials such as one of the synthetic rubber substances can also be used.

Figure 1:
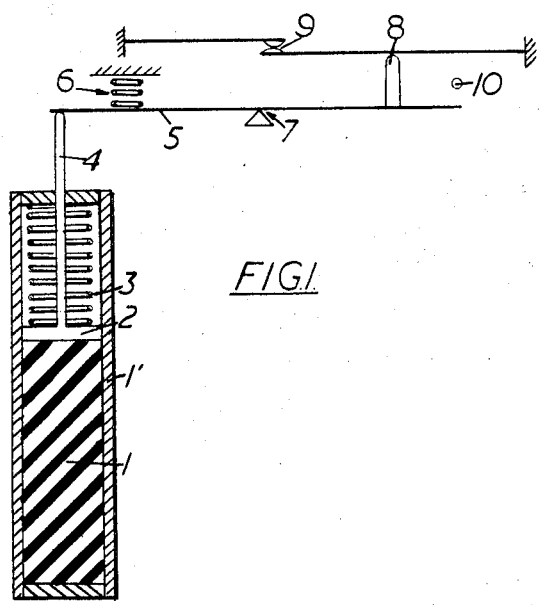
Figure 2:
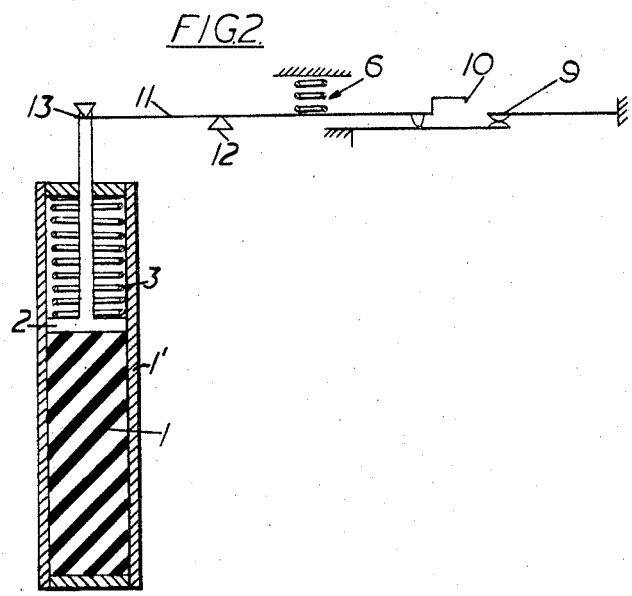

Embodiments of the invention will now be described with reference to the accompanying drawings in which FIGS. 1, 2 and 3 show schematically, in partial section, three forms of thermostat embodying the invention, while FIG. 4 shows in partial vertical section and in some detail a practical example of a thermostat embodying the invention.

As mentioned above, when rubber is used as the thermally responsive element of a thermostat, the expansion and contractions of the rubber during use cause some of the rubber in the vicinity of the piston to be degraded, and finally to turn into a powder. Hence the effective volume of the rubber decreases with life, which would cause its setting temperature to increase. To overcome this trouble, the piston operates the contact set or sets via one or more wearable members so located that wear thereof at least partly compensates for the reduction in volume due to the degradation of the rubber.

Referring to FIG. 1, 1 is a mass of rubber in a cylinder 1′ on the end surface of which mass a piston 2 acts, being urged against the rubber by a spring 3. The upper end of a piston rod 4 co-operates with a lever 5, urged by a further spring 6 against the piston rod 4. The lever 5 rocks about a pivot 7 and its other end carries a pin 8, which controls a contact set 9. 10 represents an over-ride stop which prevents the switch spring being over-stressed due to large movements of the rubber. It will be appreciated that it is desirable to use a reasonably large rubber volume as this tends to minimize the effect of rubber leakage.

The pin 8 has its end of a wearable material, and the material and the pin's position on the lever are so chosen that the change in the thermostats' characteristics due to rubber leakage are at least partly compensated by the changes in its characteristics due to the wear of the pin 8. This latter can also compensate for any changes due to wear at the pivot 7, although in this case the use of a wear-resistant material for the pivot ensures that wear thereof is very small.

In FIG. 2 the lever 11 rocks about pivot 12, its left hand end being caused by the spring 6 to bear against a pivot 13 on the end of the piston rod. Here wear in both of the pivots 12 and 13 compensates for the rubber leakage.

In FIG. 3, two pivots are involved, these being 14 and 15, and although the wear of the pivot 15 adds to the adverse effects of rubber leakage, the wear which occurs at the pivot 14 can be used to compensate for both effects.

The switch mechanism controlled by the thermostat has been shown in FIGS. 1 and 2 as a simple slow-brake leaf spring, but any other switch mechanism can be used, for example a micro-switch 9′ as shown in FIG. 3. Alternatively, the final operating element could be a valve for controlling liquids or gases or a shutter mechanism.

In FIG. 4, the thermostat is shown in considerably more detail than in FIGS. 1, 2 and 3. This thermostat has a one-piece molded body 19, in a cylindrical compartment of which is located the rubber element 20. This element preferably has a circular cross-section although different cross-sections could be used if desired.

The operating member on which the rubber acts is a bridge piece 21 having a piston which engages the rubber and an end portion acted on by a spring 23. This bridge piece co-operates with two switch plates 24, 25 via pivot pins 26, 27 respectively. Each of these plates co-operates with a bowed snap-action spring strip 28, 29, the plates being urged towards the strips by overshoot springs 30, 31. End stops 32, 33 on the plates limit overshoot when in use. Adjustment is effected by the cams indicated at 35, which co-operate with the follower levers 34.

Rubber has the advantage that it produces considerable force and thus can readily control two switch units, and could also control four such units. The main spring 23 keeps the bridge piece in contact with the rubber 20, while the lighter overshoot springs 30, 31 in normal operation maintain the switch plates against the pivots 26, 27, which are the wearable members whose wear compensates for rubber leakage. Under overshoot temperature conditions, or when the adjusting knob, not shown, which controls the setting of the cams 35 is rotated from one end of the scale to the other, the snapswitches would stop against the endstops. In this case the overshoot springs allow the switch plates to separate from the pivots 26, 27, protecting the device from excessive overshoot movements.

From room thermostat applications, the instrument is so designed that its rubber is within the thermostat box but as near the outside as possible so as to pick up room temperature change quickly and yet as far away from the terminal and switch chamber as possible to prevent its being affected by self-generated temperature rise from current conductors. In other thermostat applications, e.g., a boiler thermostat, the rubber is in a brass tube which projects from the switch housing, and the tube is inserted into the water or other medium being controlled.

It is to be understood that the foregoing description of specific examples of this invention are made by way of example only and is not to be considered as a limitation on its scope.

What is claimed is:

1. A thermostat comprising: a cylinder; a thermally expandable and contractible solid body and a piston-like member in said cylinder; means biasing said member into engagement with a surface of said body so that changes in the volume of said body due to changes in the temperature to which the thermostat is subjected cause corresponding movements of said member in said cylinder; switching means; mechanical linkage means interconnecting said member and said switching means such that when said temperature reaches a preselected value the condition of said switching means is altered; and said linkage means including means for partially compensating for the changes in the response of the thermostat due to the decrease in volume of said body during the life of the thermostat comprising at least one wearable means arranged with relation to the remainder of said linkage means.

2. A thermostat as set forth in claim 1 wherein said switching means is an electrical contact set; said linkage means including a lever pivotally mounted intermediate the ends thereof, an extension carried by said member and spring means urging one surface of said lever adjacent to one end thereof into engagement with said extension whereby said lever is controlled by said member, said wearable means being a contact-operating pin carried by said lever adjacent to the other end thereof and on the opposite surface thereof with said spring means urging said pin in a direction to affect the condition of said contact set.

3. A thermostat as set forth in claim 1 wherein said linkage means includes a lever pivotally mounted by a first pivot intermediate the ends thereof, an extension carried by said member, said extension including a second pivot engaging one surface of said lever adjacent to one end thereof, means on the opposite surface of said lever adjacent to the other end thereof for controlling said switching means, and spring means urging said one surface into engagement with said first pivot and said controlling means in a direction to affect the condition of said switching means; and said pivots being said wearable means.

4. A thermostat as set forth in claim 1 wherein said linkage means includes a lever pivotally mounted adjacent to one end thereof, an extension carried by said member and spring means urging one surface of said lever adjacent to the other end thereof into engagement with said extension whereby said lever is controlled by said member; said switching means being located adjacent to said one surface; and said wearable means being located intermediate the ends of said lever and interposed between said lever and said switching means with said spring means urging said wearable means in a direction to affect the condition of said switching means.

5. A thermostat as set forth in claim 1 wherein said linkage means includes a pivoted switch plate arranged to control said switching means, an extension carried by said member and carrying a pivot which constitutes said wearable means; said biasing means engaging said extension and urging said pivot into engagement with said switch plate; and spring means associated with said switch plate to cause movement thereof in a snap-action manner.

6. A thermostat as set forth in claim 1 wherein said linkage means includes a lever and at least one pivot pivotally mounting said lever, and said pivot being said wearable means.

References Cited

UNITED STATES PATENTS

| 639,688 | 12/1899 | Robertson | 200—122.3 |
| 725,334 | 4/1903 | Germiner | 200—137 |
| 2,354,364 | 7/1944 | Chapman | 200—137.2 |
| 2,548,941 | 4/1951 | Brown | 200—137.2 |
| 3,204,066 | 8/1965 | Gordon | 200—140 |

FOREIGN PATENTS

| 471,960 | 1/1937 | Great Britain. |

BERNARD A. GILHEANY, *Primary Examiner.*

R. COHRS, *Assistant Examiner.*

U.S. Cl. X.R.

337—394